J. B. CHURCH.
ROWLOCK HOLDER.
APPLICATION FILED OCT. 22, 1919.
1,329,579.
Patented Feb. 3, 1920.
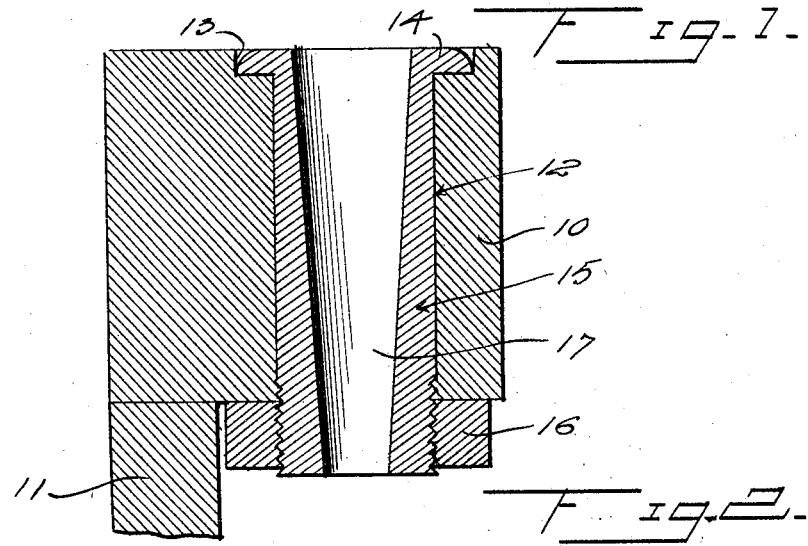
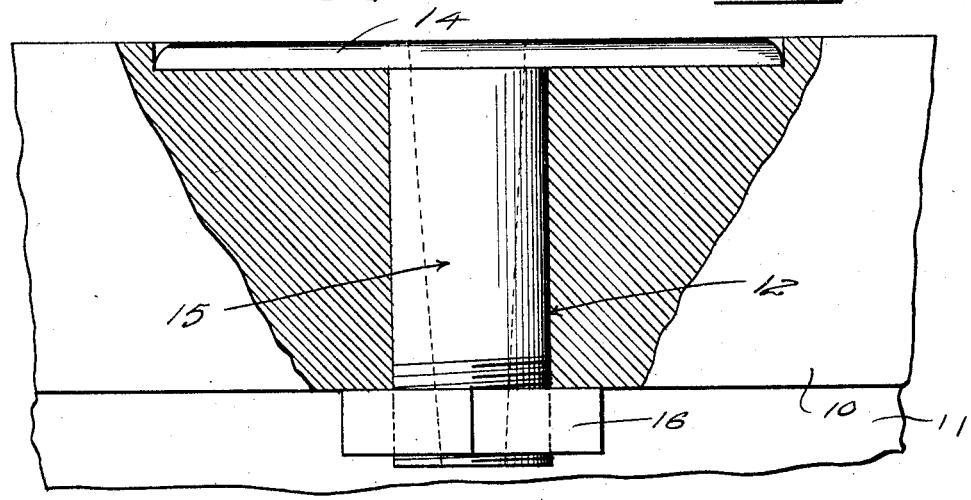
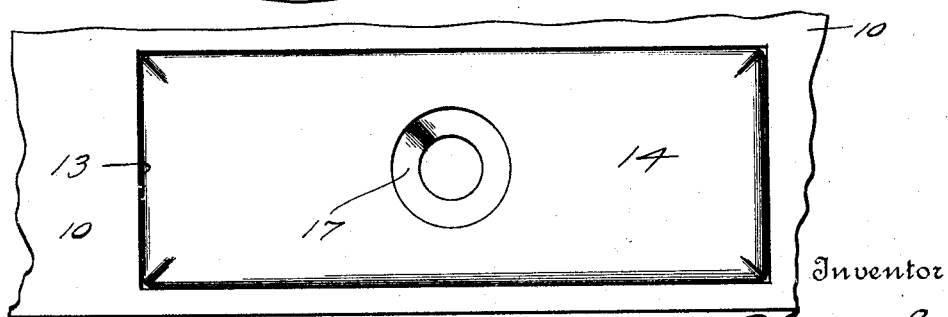

UNITED STATES PATENT OFFICE.

JAMES BOOMER CHURCH, OF SOUTHPORT, NORTH CAROLINA.

ROWLOCK-HOLDER.

1,329,579.      Specification of Letters Patent.      Patented Feb. 3, 1920.

Application filed October 22, 1919. Serial No. 332,506.

*To all whom it may concern:*

Be it known that I, JAMES B. CHURCH, a citizen of the United States of America, residing at Southport, in the county of Brunswick and State of North Carolina, have invented certain new and useful Improvements in Rowlock-Holders, of which the following is a specification.

My present invention relates generally to row lock holders or sockets, and more particularly to the holding or socket irons for fishing boats, my object being the provision of a socket or holding iron so mounted and connected as to eliminate all exposed screws and like connections at the upper surface of the gunwale of a boat, and more especially a fishing boat, so as to avoid obstruction to the passage of a net over the gunwale, or the catching and tearing of the net during its passage.

A further object of my invention is the provision of a strong, permanent fastening, which will avoid the use of screws or other more or less readily displaceable fasteners and will substitute therefor, such means as permit of an effective clamping action in connection with the gunwale as well as a connection, which though capable of ready release when desired, is normally of a practically non-displaceable nature.

In the accompanying drawing which illustrates the most desired mode or construction conceived up to the present time for carrying out my invention, Figure 1 is a transverse vertical section illustrating the practical application of my invention, Fig. 2 is a side view, partly broken away and in section, and Fig. 3 is a top plan view.

Referring now to these figures, I have generally indicated the gunwale of a row boat at 10, the inner portion of which overhangs the boat side 11, as usual and is provided in accordance with my invention with a vertical bore 12 at the desired row lock station, the upper surface of the gunwale being recessed at 13 around the upper end of the bore 12 to the depth of the upper horizontal plate or body 14 of the socket or holding iron.

The recess 13 is preferably made to snugly receive the plate 14 as shown, so that the latter when properly seated, as particularly seen in Figs. 1 and 2, has its upper flat surface flush with the upper surface of the gunwale and entirely free from fastening means, projections or other portions which would be likely to obstruct the passage of a fish net over the gunwale of the boat, or permit tearing and catching of the same.

In addition to the upper body plate 14, the row lock socket has a depending stem or shank 15 adapted to extend downwardly through the bore 12 of the gunwale with its lower end projecting below the gunwale as seen in Figs. 1 and 2, its said lower end being externally threaded to receive a nut 16 which screws thereon against the lower face of the inwardly overhanging portion of the gunwale 10, and thus serves to effectively clamp the entire iron in position, and in particular to hold the upper plate 14 snugly seated in the gunwale recess.

As thus positioned, the securing element of the socket iron, namely the nut 16, is effectively protected by the gunwale and is located in an unexposed position or at least a position comparatively out of the influence of water and so far concealed as to avoid danger of its engagement and loosening by the movements of the occupants of the boat.

By thus concealing the fastening element to the extent explained, it is obviously removed from the danger of displacement to which the ordinary exposed screws or other fastening members are subjected and its particular nature and clamping engagement with the comparatively soft surface of the gunwale, renders it practically non-displaceable.

It is of course understood that the shank or stem 15 of the socket iron is itself provided with a bore 17 extending lengthwise thereof, and preferably tapering, as particularly seen in Fig. 1, to receive the shank of the usual row lock or bracket, not shown.

I claim:—

The combination with the gunwale of a row boat, having a vertical bore, and having its upper surface recessed around the bore, of a socket iron including an upper body plate disposed in the said recess, and having an upper smooth, even surface approximately flush with the upper surface of the gunwale, a smooth cylindrical stem or shank depending from the plate within the bore of the gunwale, and having an evenly tapering row lock receiving opening, the lower end of said stem depending below the gunwale, and being externally threaded, and a nut screwing on the threaded lower end of the stem and against the lower surface of the gunwale to rigidly clamp the socket iron in place and hold its said body plate snugly within the said recess.

In testimony whereof I affix my signature.

JAMES BOOMER CHURCH.